United States Patent
Hester

(10) Patent No.: US 6,557,460 B2
(45) Date of Patent: *May 6, 2003

(54) APPARATUS FOR ROASTING FOWL

(75) Inventor: Kevin R. Hester, Lake Charles, LA (US)

(73) Assignee: Cajun Chickcan, L.L.C., Lake Charles, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/218,234

(22) Filed: Aug. 13, 2002

(65) Prior Publication Data

US 2002/0195001 A1 Dec. 26, 2002

Related U.S. Application Data

(63) Continuation of application No. 09/885,327, filed on Jun. 20, 2001, now Pat. No. 6,460,452.

(51) Int. Cl.[7] .............................. A47J 37/04; A47J 43/18
(52) U.S. Cl. ..................... 99/347; 99/419; 99/421 V; 99/426
(58) Field of Search ........................ 99/345, 346, 347, 99/419, 421 V, 426, 446

(56) References Cited

U.S. PATENT DOCUMENTS

| | | | | |
|---|---|---|---|---|
| 4,027,583 A | * | 6/1977 | Spanek et al. | 99/345 X |
| 4,718,402 A | | 1/1988 | Fordyce | |
| 5,106,642 A | | 4/1992 | Ciofalo | |
| 5,301,602 A | * | 4/1994 | Ryczek | 99/345 |
| 5,893,320 A | * | 4/1999 | Demaree | 99/419 |
| 6,119,585 A | | 9/2000 | Guidry | |
| 6,216,586 B1 | | 4/2001 | Burgin | |

OTHER PUBLICATIONS

Marlin Steel Wire Products, Website, May 31, 2001, Baltimore, MD.

* cited by examiner

Primary Examiner—Reginald L. Alexander
(74) Attorney, Agent, or Firm—William W. Stagg

(57) ABSTRACT

A wire frame for supporting a beverage can having at least one top opening and containing a desired flavored beverage in an upright position and for supporting a roasting fowl. The frame supports a beverage can to be inserted into the central cavity of a fowl that has been cleaned and seasoned as desired. The frame holds the beverage can and the whole fowl in a substantially vertical position for roasting. As the beverage heats during roasting the flavor of the beverage is imparted to the fowl.

20 Claims, 5 Drawing Sheets

APPARATUS FOR ROASTING FOWL

This is a continuation of application of Ser. No. 09/885,327 entitled "Fowl Roasting Apparatus" filed Jun. 20, 2001, is now U.S. Pat. No. 6,640,452.

BACKGROUND AND FIELD OF INVENTION

The present invention generally relates to the field of cooking utensils and, more particularly, relates to an apparatus for holding, in combination, a beverage can containing a desired flavored beverage and a selected fowl in order to facilitate the roasting and flavoring of the fowl with the vapors from beverage as the selected fowl is cooked.

DETAILED DESCRIPTION OF EMBODIMENTS

Figure 1:
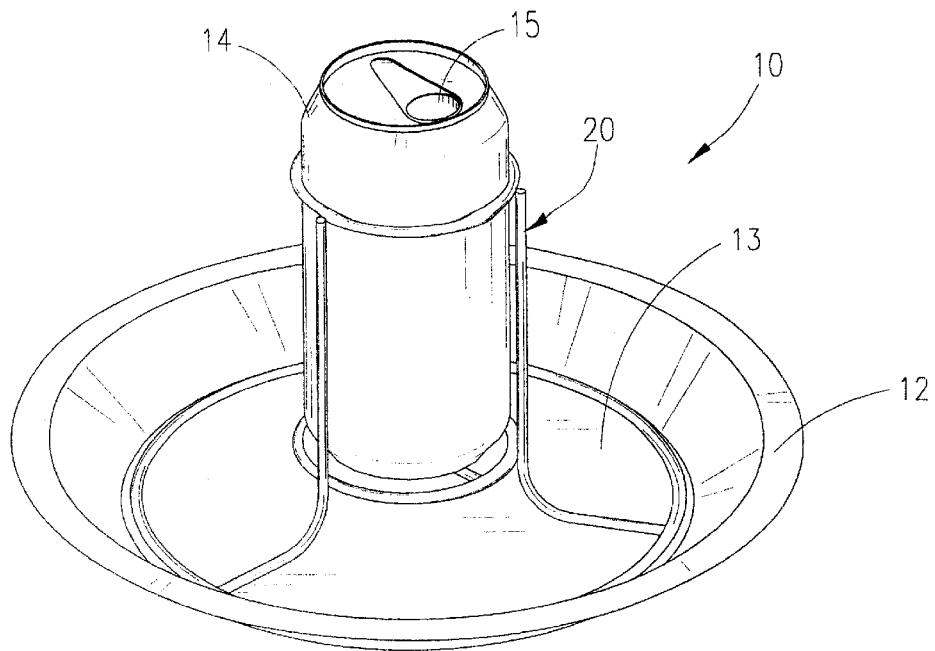
FIG. 1 is a perspective view of applicant's roasting assembly.
Figure 2:
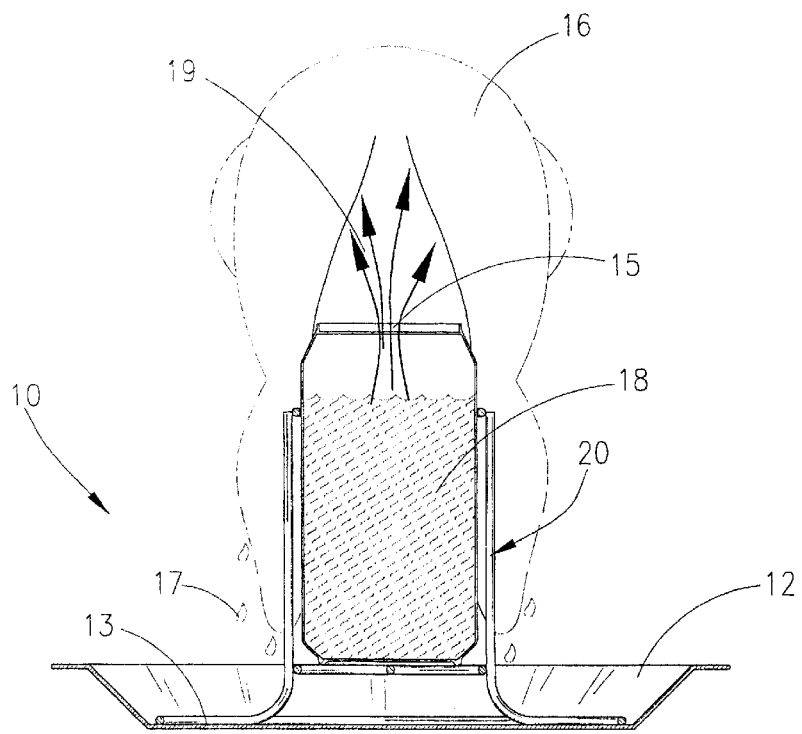
FIG. 2 is a cross-section elevation view of the roasting assembly of FIG. 1.

Referring now to the drawings, and more particularly to FIGS. 1 and 2, there is shown an embodiment of applicants roaster assembly 10. The assembly 10 is comprised of a can-fowl support frame 20, a substantially cylindrical beverage can 14 and a collecting pan 12. The can-fowl support frame 20 is comprised of a wire frame configured for receiving and holding in place the beverage can 14 in an upright position. The frame 20 is configured to rest on the bottom 13 of a pan 12 with the can 14 in its upright position. The pan 12 is utilized to collect roasting juices during roasting and may be made of metals, such as stainless steel or aluminum, glass, polymers, or other suitable heat resistant material. A disposable pans such as those made from aluminum would be suitable as the pan 12 of applicant's invention.

As can be seen in FIG. 2, there is shown an elevational cross sectional view of applicant's roaster assembly 10 in use as means for roasting a fowl 16 in a vertical position. The assembly 10 is utilized after first selecting a whole fowl 16 for roasting. The fowl 16, whether chicken, duck, turkey or other roasting bird, having been cleaned and washed to leave an interior cavity with opening at the head and tail end of the fowl, is seasoned as desired. Next, a beverage can 14 having top opening 15 containing a desired beverage for flavoring the fowl is placed within the frame 20 so that the can 14 is supported by the frame 20 in an upright position. The whole fowl 16 is then placed over the frame 20 and can 14 by means of inserting the frame 20 and can 14 into the interior cavity of the fowl 16 so as to support the fowl on the frame 20 with the open can 14 extending at least partially into the interior cavity of fowl 16. The frame 20 along with the can 14 and supported fowl 16 is then placed on the bottom 13 of pan 12. The base 13 of the pan 12 has a diameter sufficiently wider than the width of the support frame 20 and fowl 16 to facilitate the collection of roasting juices in pan 12 during roasting.

The roasting assembly 10, comprised of the pan 12, the frame 20 and can 14, along with the supported fowl 16, is then placed in a roaster, oven, or on the surface of a barbecue grill heating and correspondingly roasting the fowl. As the temperature of the assembly 10 rises during heating, the beverage liquid contained in the can 14 will begin to vaporize as indicated by arrows 19 to permeate the fowl with the vapors of the desired beverage as a flavoring as the fowl 16 as it is roasted. Juices 17 from the roasting fowl 16 are collected on the bottom 13 of the pan 12 during the roasting process. The can 14 may contain any desired beverage such as beer, variously flavored soft drinks, or fruit based beverages such as tomato juice, orange juice, apple juice, grape juice or the like. Other spices or seasonings may be added to the beverage in can 14 if desired.

In applicant's assembly 10, juices 17 from the roasted fowl 16 are collected in the pan 12 to avoid mess during roasting and for ease of clean up of the cooking. The pan 12 is of sufficient dimensions to extend beyond the width of the fowl 16 when the fowl 16 is mounted on the frame 20. The juices 17 collected in pan 12 may be discarded or otherwise used as basting liquids or other cooking purposes. After the fowl 16 is cooked as desired, it can be pulled from the frame 20 and set aside for cooling. The pan 12, if disposable, and the can 14 may be discarded leaving only the frame 12 to be cleaned and reused. The frame 20 may be comprised of any heat resistant material, whether metal, glass or polymer materials, though it is suggested that wire comprised of kitchen grade stainless steel or aluminum be utilized to form the frame 20.

Figure 3:
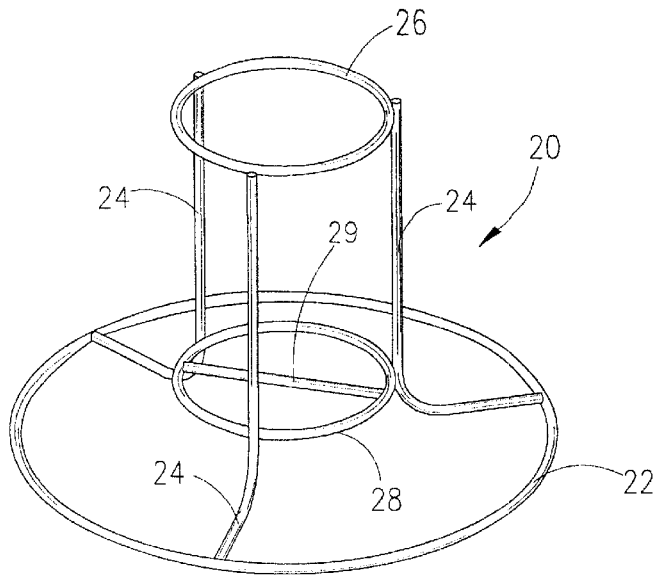
FIG. 3 is a perspective view of applicant's can-fowl support frame 20.
Figure 4:
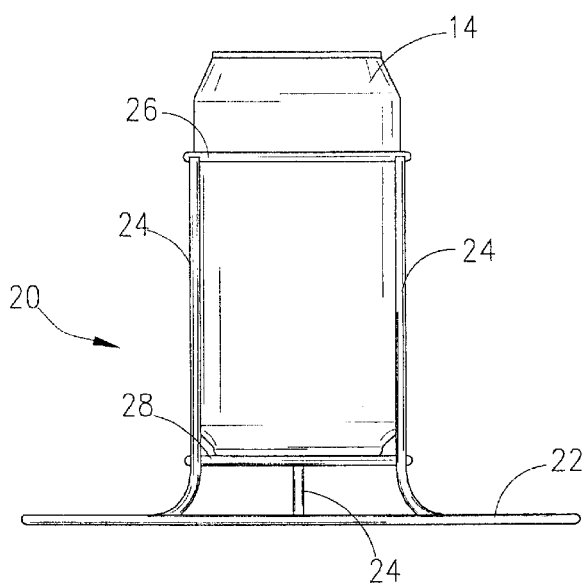
FIG. 4 is an elevation view of the can-fowl support frame 20 depicted in FIG. 3.

FIG. 3 shows a perspective view of the frame 20 of applicant's assembly 10. The frame 20 is comprised of a frame base ring 22 of a desired diameter and an upper frame support ring 26. The upper support ring 26 is of a diameter sufficient to encircle a desired sized beverage can 14 when the can 14 is insert within the ring. A plurality of L-shaped struts 24 are arrayed uniformly around the center of the base ring 22 and mounted to the base ring 22 so as provide a plurality of supporting members extending vertically from the base ring 22. The upper ring 26 is mounted to the vertical extending portion of the L-shaped struts 24 so as to support the ring 26 at a desired fixed location above the base ring 22. A can support ring 28 having support bar 29 is mounted to the struts 24 at a desired point between the base ring 22 and the upper ring 26, the support ring 28 being concentric with and parallel to the base ring 22 and the upper ring 28. As shown in FIG. 4, a beverage can 14 may then be inserted within upper ring 26 and supported in an upright position by frame 20 by means of the can support ring 28 and the struts 24.

Figure 5:
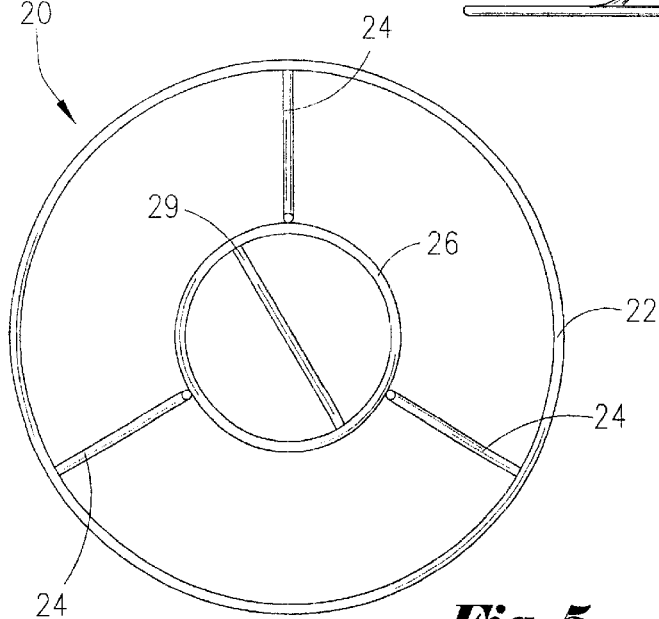
FIG. 5 is a top view of the can-fowl support frame 20 depicted in FIG. 3.

FIG. 5 is a plan view of the frame 20 shown in FIG. 3. This view shows the concentric orientation of the support ring 28 with respect to the base ring 22 and the upper ring 26 as well as the uniform spacing of the L-shaped struts 24. The support arm 29 is shown fixed across the support ring 28 to aid in the support the beverage can 14.

Figure 6:
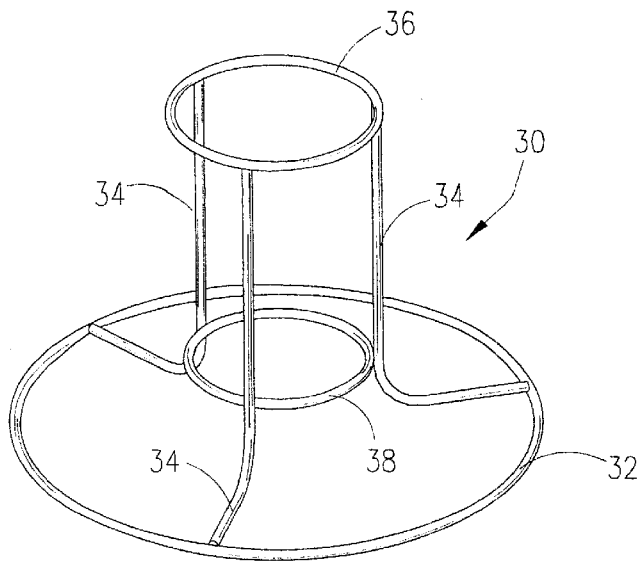
FIG. 6 is a perspective view of applicant's can-fowl support frame 30.
Figure 7:
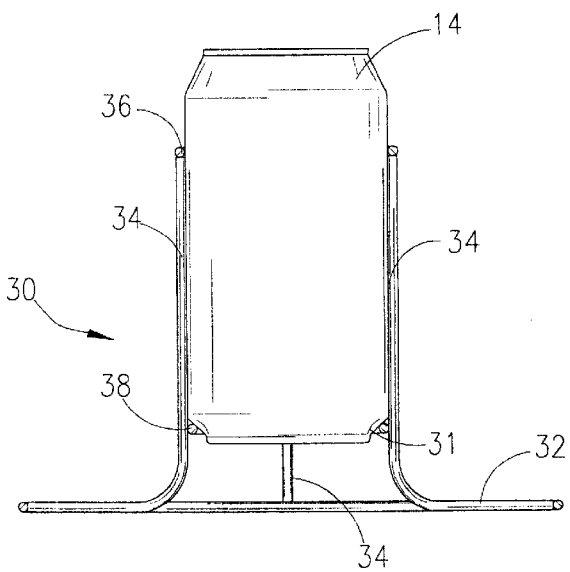
FIG. 7 is an elevation view of the can-fowl support frame 30 depicted in FIG. 6.
Figure 8:
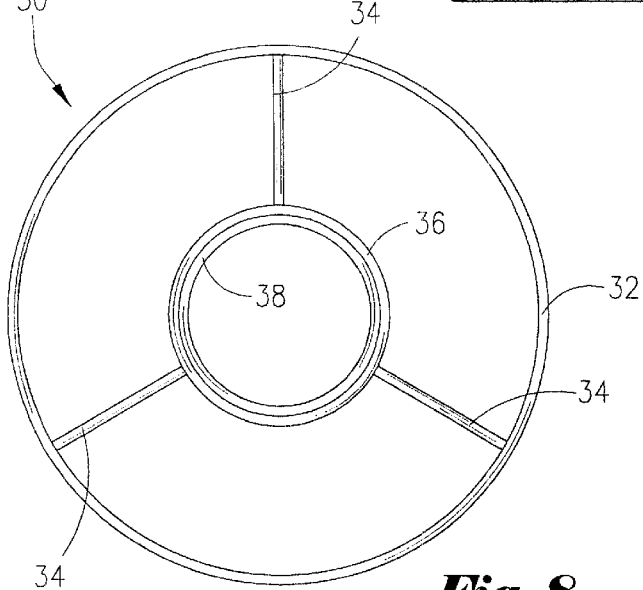
FIG. 8 is a top view of the can-fowl support frame 30 depicted in FIG. 6.

Another embodiment of applicant's invention is that illustrated in FIGS. 6, 7 and 8. In FIG. 6 there is shown the embodiment of a can-fowl support frame 30. The frame 30 is comprised of a base support ring 32, an upper frame support ring 36, and a can support ring 38. The frame support ring 36 is connected to the base support ring 32 by means of a plurality of L-shaped, vertically extending, struts 34. In the embodiment depicted in FIG. 6, the struts 34 are arrayed in a desired angular relationship around the inside of the base ring 32 and are attached to the frame support ring 36 in a manner to position the frame support ring 36 above the base ring 32 to form the can-fowl support frame 30. The frame support ring 36 is of a diameter sufficient to receive a beverage can 14 when the can 14 is insert in an upright position through the support ring 36.

As shown in FIG. 6, and more particularly in FIG. 7, the can support ring 38 is fixed at its outer edge between the vertically extending support struts 34 at a desired position for supporting a beverage can 14 in an upright position on the frame 30 within the struts 34. In this embodiment, the can support ring 38 is of a diameter sufficient to receive and support along its periphery the flanged base of a standard aluminum beverage can. As can be seen in FIG. 8, a top view of can-fowl support frame 30, the can support ring 38 has a narrower diameter than the upper can ring 36. As shown in FIG. 7, the narrower diameter of the can support ring 38 allows the flanged based 31 of a standard beverage, typically narrower than the overall diameter of the can 14 itself, to be received and supported within the support ring 38.

Figure 9:
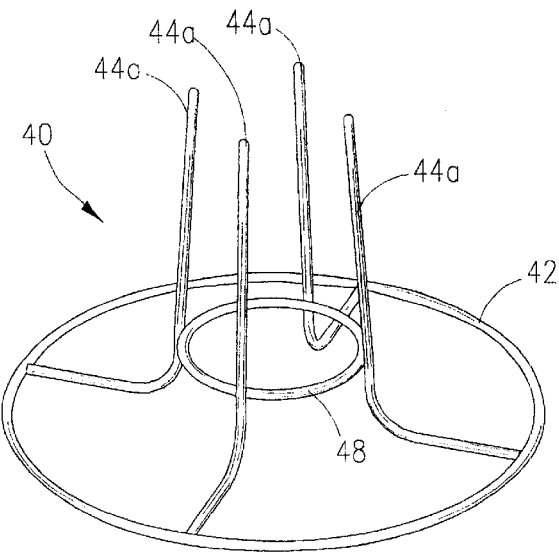
FIG. 9 is a perspective view of applicant's can-fowl support frame 40.
Figure 10:
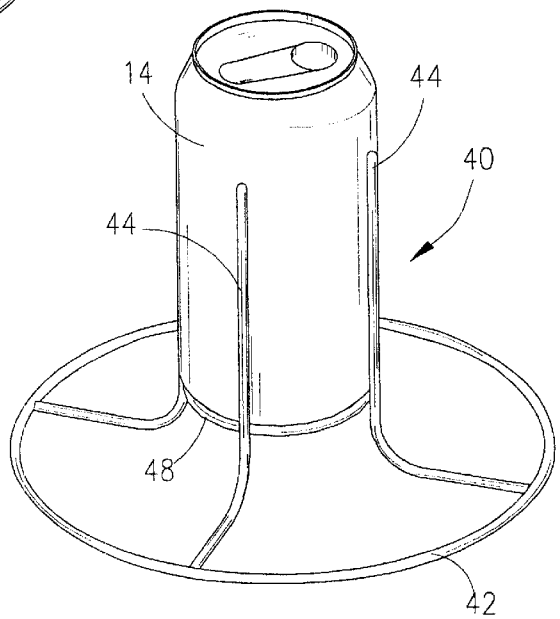
FIG. 10 is an elevation view of the can-fowl support frame 40 depicted in FIG. 9
Figure 11:
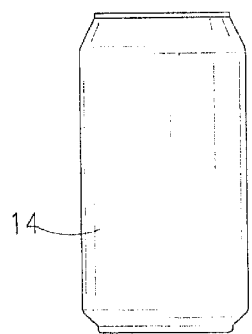
FIG. 11 is an elevation view of the can-fowl support frame 40 depicted in FIG. 9.

Can-fowl support frame 40, still another embodiment of applicant's invention, is shown in FIGS. 9, 10 and 11. Frame 40 is comprised of a base ring 42, a plurality of L-shaped, vertically extending, inwardly flexed, struts 44 and a can support ring 48. The can support ring 48 is positioned at a desired point along the struts 44 at a point concentric with and above the base ring 42. As can be seen in FIGS. 9 and 10, and more particularly in FIG. 11, the struts 44 flex from an initial inward position 44a to an outward position 44b as indicated by arrows 49. This flexibility accommodates the insertion of a beverage can 14 between the struts 44 so that the can 14 may be supported on can support ring 48. In this embodiment, as in the embodiment depicted in FIGS. 6, 7 and 8, the can support ring 48 has a diameter slightly narrower than the overall diameter of the beverage can 14, but sufficient to receive and support the flanged base 31 of a standard aluminum beverage can 14.

Figure 12:
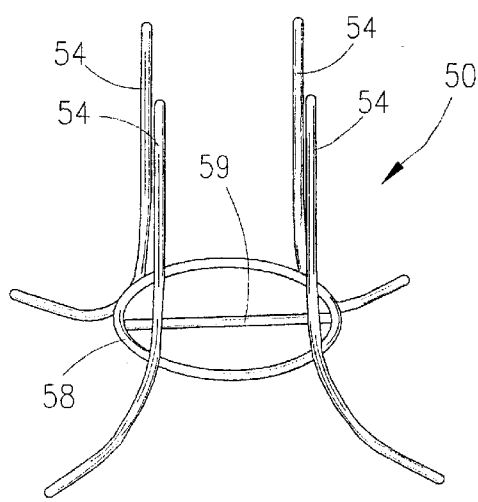
FIG. 12 is a perspective view of applicant's can-fowl support frame 50.
Figure 13:
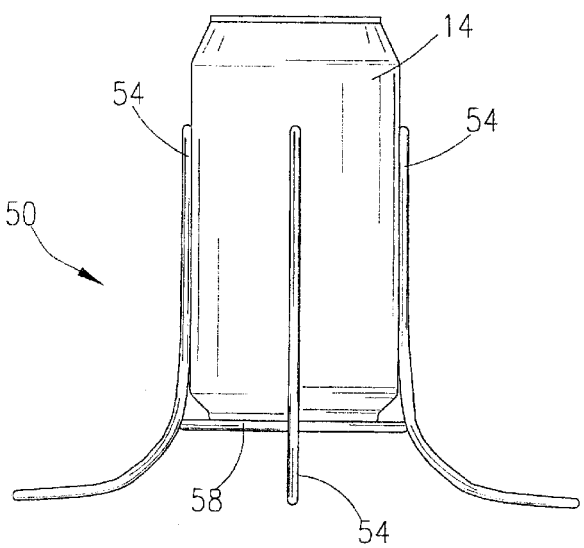
FIG. 13 is an elevation view of the can-fowl support frame 50 depicted in FIG. 12.
Figure 14:
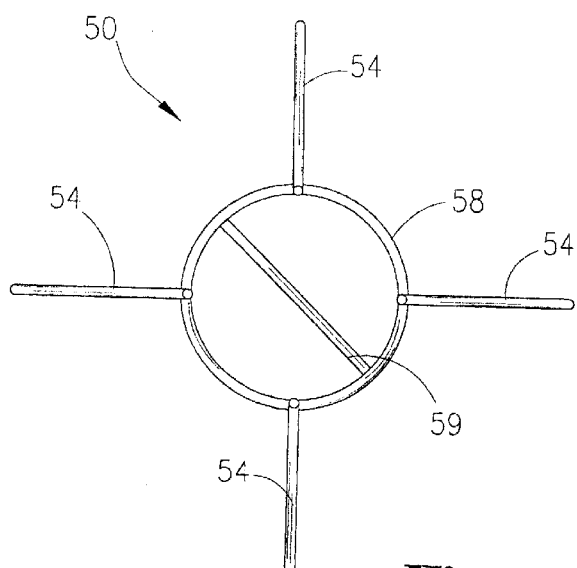
FIG. 14 is a top view of the can-fowl support frame 50 depicted in FIG. 12.

Still another embodiment of applicant's invention is shown in FIGS. 12, 13 and 14. FIG. 12 shows a perspective view of can-fowl support frame 50. The frame 50 is comprised of a plurality of L-shaped, vertically extending, struts 54 mounted uniformly around the periphery of a can support ring 58. The horizontal leg of the L-shaped struts 54 form a base for supporting the frame 50. The can support ring 58 is of a diameter only slightly larger that the diameter of a selected beverage can 14 for which it is intended to support. As shown in FIG. 13, the beverage can 14 is inserted in an upright position between the vertical legs of the support struts 54 and supported on the support ring 58 in its upright position. FIG. 14, a plan view of the frame 50 shows a support bar 59 extending diagonally across the support ring 58 to support the can 14 and reinforce the frame 50.

The above described can-fowl support frames, designated 30, 40 and 50, may be substituted for the can-fowl support frame 20 described above and may used in the roaster assembly 10 in conjunction with a can 14 and a pan 12 in the manner as described as described here and depicted in FIGS. 1 and 2. The frames 20, 30, 40 and 50 assembly in each of these embodiments may be constructed of any heat resistant non-toxic material, whether metal or polymer, though it is thought that a food grade stainless steel or aluminum wire would be the preferred material.

The frames 20, 30, 40 and 50 of applicant's invention are configured to support and hold a beverage can in an upright position for internally flavoring the fowl to be roasted and are easily cleaned for reuse. Because beverage cans are produced in a variety of sizes, standard sizes such as 12 oz., 16 oz., or 20 oz. cans being commonly found, the frames 20, 30, 40 and 50 may also be configured in a variety of dimensions to support a can 14 of a desired size. Similarly, the frames 20, 30, 40 and 50 may be configured in size and dimension for supporting fowl of various sizes and weights. It is understood that frames 20, 30, 40 and 50 configured in size for roasting a turkey may necessarily be larger than those that might be configured in size for roasting a chicken.

It is also understood by applicant that the assembly 10 may be modified to eliminate the pan 12 and that a fowl 16 may be mounted on any of the frames 20, 30, 40, 50 in combination with a desired beverage can 14 for roasting without employing a pan 12 to collect the juices 17 from the roasting fowl 16. When the pan 12 is not so employed, it is understood that the juices 17 produced by the roasting fowl 16 when mounted frames 20, 30, 40, 50, in combination with a desired beverage can 14, will drop from the fowl 16 and not be collected. Consequently, a heating means having an independent collection means for the juices 17 or an outside barbecue grill must be employed to avoid the mess of cleanup brought on by the dropping juices.

It is thought that the fowl roaster apparatus and method of the present invention and many of its attendant advantages will be understood from the foregoing description. It is also thought, and it will be apparent, that various changes may be make in the form, construction and arrangement of the parts thereof without departing from the spirit and scope of the invention or sacrificing all of its material advantages.

I claim:

1. An frame for holding a fowl for roasting, the fowl being cleaned so as to provide an interior body cavity, and for supporting an opened beverage can within the interior cavity of the fowl during roasting comprising:

(a) a base ring;

(b) an upper ring, said upper ring having a diameter sufficient to receive a beverage can;

(c) a plurality of struts mounted around the periphery of said base ring and said upper ring, said struts being configured to hold said upper ring concentric with and above said base ring;

(d) a support ring for supporting said beverage can, said support ring being concentrically mounted on said struts between said base ring and said upper ring, said support ring having a diameter sufficient to receive and support said beverage can along its base when said beverage can is inserted vertically onto said support ring whereby, when said beverage can is supported on said frame and inserted into said interior cavity of said fowl, said fowl is support by said frame in a substantially vertical and stable position with said beverage can positioned at least partially into said interior cavity of said fowl.

2. The frame as recited in claim 1 wherein said struts are L-shaped.

3. The frame as recited in claim 2 wherein said frame is made from wire.

4. The frame as recited in claim 3 wherein said wire is stainless steel.

5. The frame as recited in claim 3 wherein said wire is aluminum.

6. An apparatus for roasting a fowl, the fowl being cleaned so as to provide an interior body cavity, comprising:
   (a) a frame for holding said fowl in a substantially vertical and stable position on said frame, said frame comprising:
      (i) a base ring of a diameter sufficient to support said fowl in a substantially vertical and stable position; and
      (ii) a plurality of L-shaped struts mounted around said base ring, each of said struts having a base leg extending toward the center of said base ring and a vertical leg extending vertically from said base leg of said struts to a point above said base ring, said vertical legs of said struts being inwardly flexed; and
   (a) a can support ring mounted on said vertical legs of said struts of said frame concentrically with said base ring of said frame, said can support ring having a diameter configured to receive and support a beverage can having an open top, a bottom and cylindrical sidewalls when said beverage can is inserted between said inwardly flexed vertical legs of said struts so as to engage said sidewalls of said beverage can with said vertical legs of said struts.

7. The apparatus as recited in claim 6 wherein said frame is made from metal wire.

8. The apparatus as recited in claim 7 wherein said wire is stainless steel.

9. The apparatus as recited in claim 7 wherein said wire is aluminum.

10. The apparatus as recited in claim 3 wherein said can support ring is configured to receive the flange base of said beverage can when said beverage can has said flanged base area extending along the bottom of an bottom and said can sidewalls.

11. The apparatus as recited in claim 7 wherein said support ring is configured to receive the flange base of said beverage can when said beverage can has said flanged base area extending between said can bottom and said can sidewalls.

12. A frame for holding a fowl and an open beverage can containing a quantity of a desired liquid within the body cavity of a fowl in a substantially vertical and stable position for flavoring said fowl during roasting on said frame, said frame comprising:
   a. a base ring of a diameter sufficient to support said fowl and said beverage can in combination in a substantially vertical and stable position;
   b. a plurality of L-shaped struts mounted around said base ring, each of said struts having a base leg extending toward the center of said base ring and a vertical leg extending vertically from said base leg of said struts to a point above said base ring; and
   c. a can support ring, said can support ring being mounted, concentrically with said base ring, on said vertical legs of said struts, said can support ring having a diameter sufficient to support said can when said beverage can is inserted between said vertical legs of said struts.

13. The frame as recited in claim 12 wherein said frame is made from metal wire.

14. The frame as recited in claim 13 wherein said wire is stainless steel.

15. The frame as recited in claim 14 wherein said wire is aluminum.

16. The frame of claim 13 further comprising a support bar extending diagonally across said can support ring.

17. The frame of claim 14 further comprising an upper support ring mounted to said L-shaped struts above said can support ring.

18. A roasting apparatus comprising a wire frame, said wire frame having a base, a plurality of struts mounted to and extending vertically from said base, an upper ring supported on said struts above said base, and a lower ring supported on said struts concentric with said upper ring between said upper ring and said base, whereby, when a beverage can having at least one top opening and containing a desired flavored beverage is positioned between said struts and supported on said lower ring, said struts and said beverage can maybe inserted into the body cavity of a fowl to support said fowl on said frame in a substantially vertical and stable position for roasting.

19. The frame as recited in claim 18 wherein, said base of said frame is a ring.

20. The frame of claim 19 wherein, the diameter of said upper ring is narrower than the diameter of said ring forming said base.

* * * * *